(12) United States Patent
Rausch et al.

(10) Patent No.: US 9,153,272 B1
(45) Date of Patent: Oct. 6, 2015

(54) CHARACTERIZING LASER OUTPUT IN A HAMR DEVICE

(71) Applicant: Seagate Technology LLC, Cupertino, CA (US)

(72) Inventors: Tim Rausch, Farmington, MN (US); Jon D. Trantham, Chanhassen, MN (US); John W. Dykes, Eden Prairie, MN (US); Won Choul Yang, Kowloon Tong (HK)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/278,386

(22) Filed: May 15, 2014

(51) Int. Cl.
| | |
|---|---|
| *G11B 11/00* | (2006.01) |
| *G11B 7/1267* | (2012.01) |
| *G11B 5/012* | (2006.01) |
| *G11B 7/1263* | (2012.01) |
| *G11B 5/00* | (2006.01) |

(52) U.S. Cl.
CPC .............. *G11B 7/1267* (2013.01); *G11B 5/012* (2013.01); *G11B 7/1263* (2013.01); *G11B 2005/0021* (2013.01)

(58) Field of Classification Search
CPC ........ G11B 5/4866; G11B 2005/0021; G11B 5/314; G11B 5/6088; G11B 2005/001; G11B 7/1387; G11B 13/045; G11B 11/1058; G11B 5/3133; G11B 5/3163; G11B 13/08; G11B 7/1384; G11B 7/1267
USPC ........ 369/13.33, 13.32, 13.24, 13.01, 112.27, 369/13.13, 13.27, 13.26
See application file for complete search history.

(56) References Cited

U.S. PATENT DOCUMENTS

| | | | |
|---|---|---|---|
| 5,602,814 A * | 2/1997 | Jaquette et al. ............ 369/47.53 |
| 6,671,232 B1 | 12/2003 | Stupp | |
| 8,406,090 B2 | 3/2013 | Juang et al. | |
| 8,451,696 B2 | 5/2013 | Huang et al. | |
| 8,824,085 B2 * | 9/2014 | Wilson et al. .................... 360/59 |
| 8,854,929 B1 * | 10/2014 | Champion et al. ......... 369/13.26 |
| 8,897,103 B2 * | 11/2014 | Alex .......................... 369/13.26 |
| 2001/0048696 A1 | 12/2001 | Otsuka | |
| 2005/0213243 A1 | 9/2005 | Huang et al. | |
| 2006/0203693 A1 | 9/2006 | Aoyama | |
| 2006/0221787 A1 | 10/2006 | Kitagaki et al. | |
| 2008/0192594 A1 | 8/2008 | Liu | |

(Continued)

FOREIGN PATENT DOCUMENTS

| | | |
|---|---|---|
| EP | 0548111 | 9/1997 |
| EP | 2071568 A1 | 6/2009 |

OTHER PUBLICATIONS

Office Action dated Jul. 16, 2015 for U.S. Appl. No. 14/278,377, 10 pages.

(Continued)

*Primary Examiner* — Ali Neyzari
(74) *Attorney, Agent, or Firm* — Leanne Taveggia Farrell; Westman, Champlin & Koehler, P.A.

(57) ABSTRACT

At least one laser input current is applied to a laser in a heat assisted magnetic recording device. Laser output power of the laser is measured at the at least one applied laser current. A relationship is characterized amongst temperature, applied laser input current and laser output power. Laser current is set to an optimal laser current as determined at manufacturing. A metric of recording performance is measured to determine if the relationship is acceptable.

20 Claims, 6 Drawing Sheets

(56) References Cited

U.S. PATENT DOCUMENTS

| | | |
|---|---|---|
| 2008/0310268 A1 | 12/2008 | Chuang |
| 2010/0296285 A1 | 11/2010 | Chemel et al. |
| 2011/0205861 A1* | 8/2011 | Erden et al. ............... 369/13.27 |
| 2011/0228651 A1 | 9/2011 | Gage et al. |
| 2013/0077453 A1 | 3/2013 | Alex |

OTHER PUBLICATIONS

International Search Report and Written Opinion from the Korean Intellectual Property Office mailed Jul. 22, 2015 for corresponding International Application No. PCT/US20151027097 filed Apr. 22, 2015, 11 pages.

* cited by examiner

CHARACTERIZING LASER OUTPUT IN A HAMR DEVICE

BACKGROUND

Heat-assisted magnetic recording (HAMR) is a data storage technique for data storage devices where a small laser is used to heat the part of the recording medium that is being written. The heat changes the magnetic properties of the portion of the recording medium while the recording medium is being recorded, which reduces or removes the superparamagnetic effect while recording takes place so as to increase the amount of data that can be held on the recording medium.

The discussion above is merely provided for general background information and is not intended to be used as an aid in determining the scope of the claimed subject matter.

SUMMARY

A method of characterizing laser output in a heat assisted magnetic recording device can be performed by control circuitry in a data storage device. At least one laser input current is applied to a laser in a heat assisted magnetic recording device. Laser output power of the laser is measured at the at least one applied laser current. A relationship is characterized amongst temperature, applied laser input current and laser output power. Laser current is set to an optimal laser current as determined at manufacturing. A metric of recording performance is measured to determine if the relationship is acceptable.

In another embodiment, a method includes measuring a first laser output power of a laser used to record data on a head assisted magnetic recording medium at a first laser input current, measuring a second laser output power of the laser at a second laser input that is greater than or less than the first laser input current, characterizing a relationship amongst temperature, laser input current and laser output power and verifying the relationship by measuring a metric of recording performance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

This disclosure describes characterizing laser output in a Heat Assisted Magnetic Recording (HAMR) device during normal device operation to improve the quality of the recording signal. In other words, a relationship amongst temperature, applied laser input current and laser output power is characterized. After characterization, the relationship is verified by measuring a metric of recording performance to determine if the relationship is acceptable.

Figure 1:
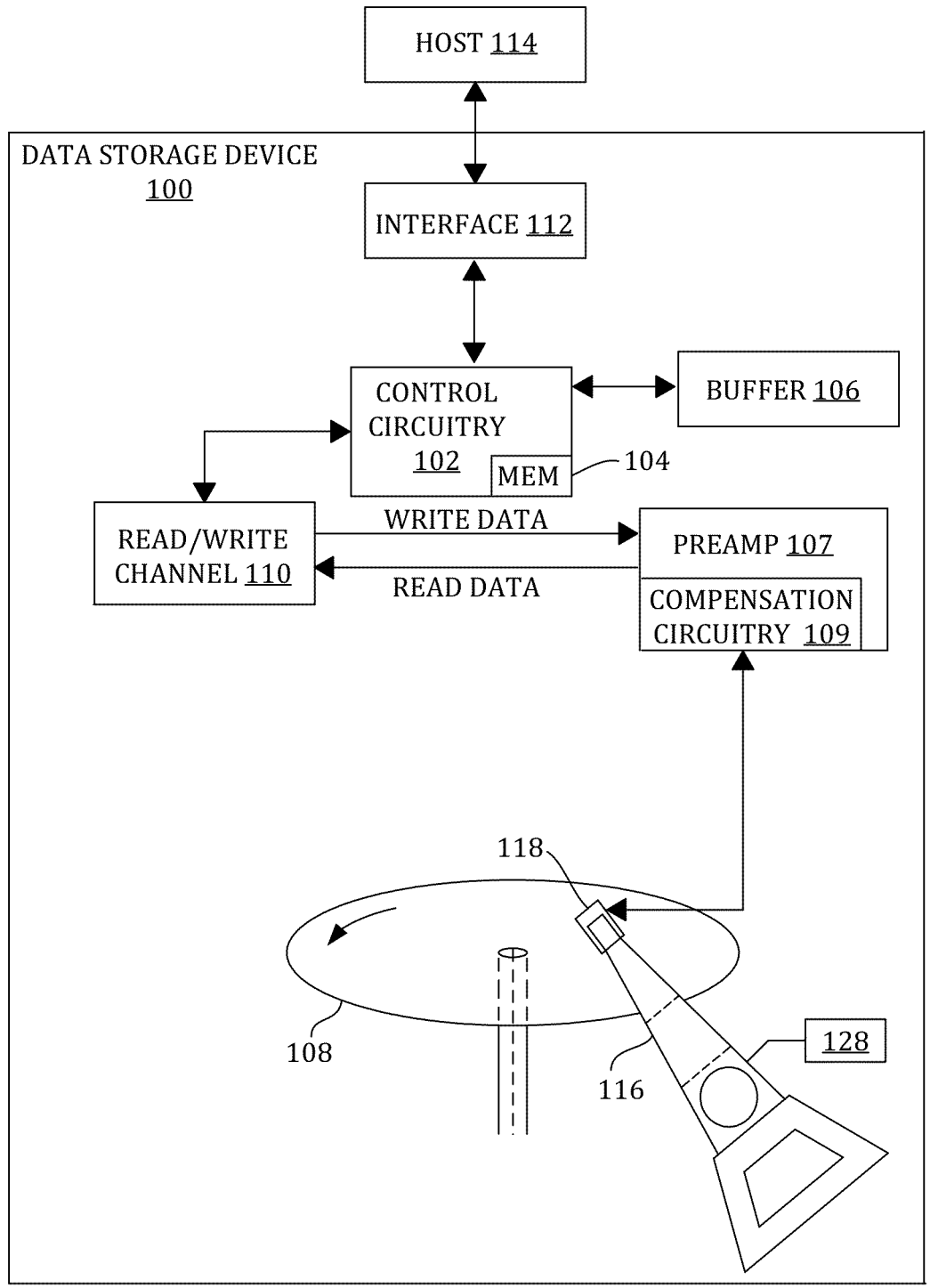
FIG. 1 is a schematic diagram of exemplary components of a data storage device including a head stack assembly and a medium.

FIG. 1 is a simplified block diagram of an exemplary data storage device 100 that can be used in embodiments described herein. Data storage device 100 includes control circuitry 102, which is used for controlling operations of data storage device 100 with the use of programming stored in memory 104. Control circuitry 102 may be coupled to a buffer 106 through a read/write channel 110. Buffer 106 can temporarily store user data during read and write operations and may include the capability of temporarily storing access operations pending execution by control circuitry 102.

Data storage device 100 includes storage medium or magnetic recording medium (i.e., disc) 108 and a suspension 116 supporting a transducing head 118 (in this case a HAMR transducing head) that can read and write data to medium 108. In the embodiment illustrated in FIG. 1, the storage medium 108 is illustrated as being a rotatable disc. Data storage device 100 also includes a preamplifier (preamp) 107 for generating a write signal applied to transducing head 118 during a write operation, and for amplifying a read signal emanating from transducing head 118 during a read operation. In some embodiments, preamp 107 also includes compensation circuitry 109. Compensation circuitry 109 will be discussed in detail below.

Control circuitry 102 executes read and write operations on data storage medium 108. These read/write operations executed by control circuitry 102 may be performed directly on data storage medium 108 or through read/write channel 110. Read/write channel 110 receives data from control circuitry 102 during a write operation, and provides encoded write data to data storage medium 108 via preamp 107. During a read operation, read/write channel 110 processes a read signal via preamp 107 in order to detect and decode data recorded on data storage medium 108. The decoded data is provided to control circuitry 102 and ultimately through an interface 112 to an external host 114.

External host 114 contains logic (e.g., a processor) capable of issuing commands to data storage device 100. Although FIG. 1 illustrates external host 114 as being a single host, data storage device 100 can be connected through interface 112 to multiple hosts. Via interface 112, data storage device 100 receives data and commands from external host 114 and can provide data to external host 114 based on commands executed by control circuitry 102.

Figure 2:
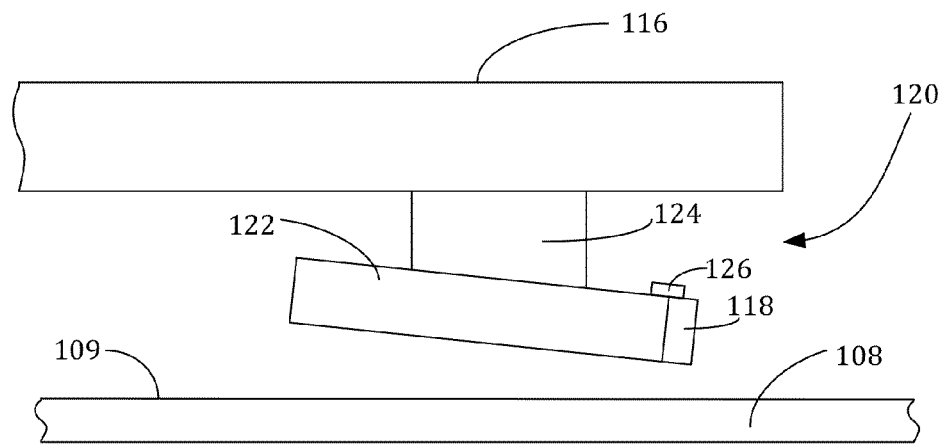
FIG. 2 is a schematic diagram of a side view of a head gimbal assembly (HGA).

FIG. 2 illustrates an enlarged side view of a head gimbal assembly (HGA) 120 illustrating a suspension 116 supporting a slider 122 by a gimbal 124. Slider 122 includes transducing head 118, which is rotatable relative to suspension 116 via gimbal 124. Transducing head 118 is located at a trailing edge of slider 122 and is held proximate to surface 109 of medium 108 for reading and writing data.

HAMR transducing heads, such as a transducing head 118, use an energy source to locally heat a small portion of a recording medium to overcome superparamagnetic effects that limit the areal data density of a magnetic medium, such as medium 108. The heating of the medium raises a region of the medium's temperature above a set temperature, allowing for it to be magnetized by a magnetic writer. The medium quickly cools as it rotates away from the energy source and therefore magnetically freezes the written pattern for stable, long-term storage of data.

Figure 3:
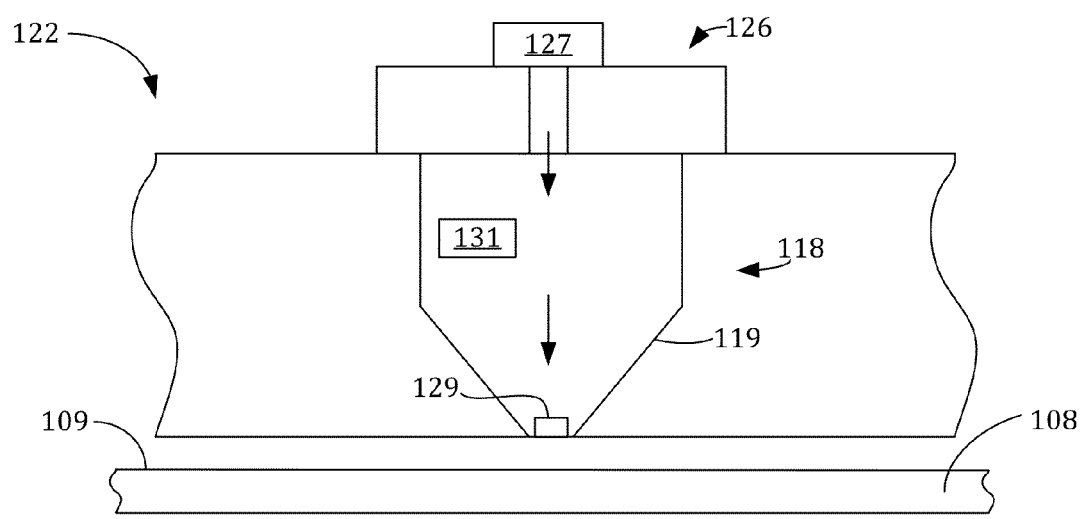
FIG. 3 illustrates an enlarged diagram of a trailing end of a slider of the HGA illustrated in FIG. 2.

FIG. 3 illustrates an enlarged diagram of a trailing end of slider 122. HAMR transducing head 118 may include optical components, such as an optical wave guide 119, that direct, concentrate and transform light energy from a laser assembly 126 to heat medium 108. Laser assembly 126 includes a laser diode that receives a current input and applies laser energy onto medium 108 through optical wave guide 119. The HAMR medium hot spot may need to be smaller than the diffraction limit of light. One way to achieve such small hot spots is to use an optical near field transducer (NFT) 129.

Control of the applied laser energy in a HAMR device is essential to performance. If the heat energy imparted to the medium 108 is too low then medium 108 is not sufficiently heated, and the recorded signal is of a poor quality. If the energy is too high, the recorded signal of adjacent tracks may be partially erased, which causes degradation. Moreover, the energy can change even if the current of the heat energy is constant. For example, the laser energy for a given laser current varies with temperature and also varies with other effects, such as with laser diode aging or other component aging. For example, as components age, the amount of applied laser current needed to achieve the same degree of media heating may vary.

In one embodiment, laser diode input current may be controlled by a register in preamplifier 107 (FIG. 1). Preamplifier 107 contains a digital-to-analog converter (DAC) to convert the programmed register value into an applied current. The laser energy output from transducing head 118 (FIGS. 2 and 3) onto medium 108 can vary. Even if the current to the laser diode is accurate and constant, the power output from the laser diode may not. For example, a forward voltage drop of the laser diode can cause this relationship to vary. In addition, the preamplifier's applied current may not always be accurate and may also vary. Temperature has a strong effect on all of these variations.

There are two parameters that are critical to drive quality—the bit-error-rate (BER) of the written track on the media and the degradation imparted to adjacent tracks (adjacent track erasure or ATE) by the write operation. Changes in laser power impact both of these parameters. Unfortunately, to perform BER and ATE measurements well, many revolutions of the media are required. In addition, experimentally performing these measurements may cause degradation to the data on adjacent tracks. Therefore, performing BER and ATE measurements are not practical to perform on a frequent basis while the drive is in normal operation.

Two parameters that can be sensed regularly without performance degradation include temperature and laser output power. Temperature can be sensed periodically using a thermistor 128, for example. Laser output power can also be sensed in real-time, for example, with a sensor such as a photodiode 127 or bolometer 131. In the embodiment illustrated in FIG. 3, photodiode 127 is part of laser assembly 126, which can be manufactured on each transducing head and can be used to measure the laser power or energy within the recording head. The arrow within transducing head 118 in FIG. 3 illustrates the path of laser energy through optical wave guide 119 from laser assembly 126 to NFT 129. As shown, laser energy emanates from laser assembly 126 and energy from NFT 129 heats a portion of medium 108. In an alternative embodiment, bolometer 131 is coupled to optical wave guide 119 and may also measure laser output power in recording head 118.

There are three general modes of operation for the laser diode in a HAMR drive. When idle, the diode is fully off or inactive (no applied current). When writing data, the diode is fully on or active with an applied current sufficient to record or erase data to medium 108. In preparation for writing, the laser diode is partially on or biased with a current insufficient to record or erase data to medium 108.

Figure 4:
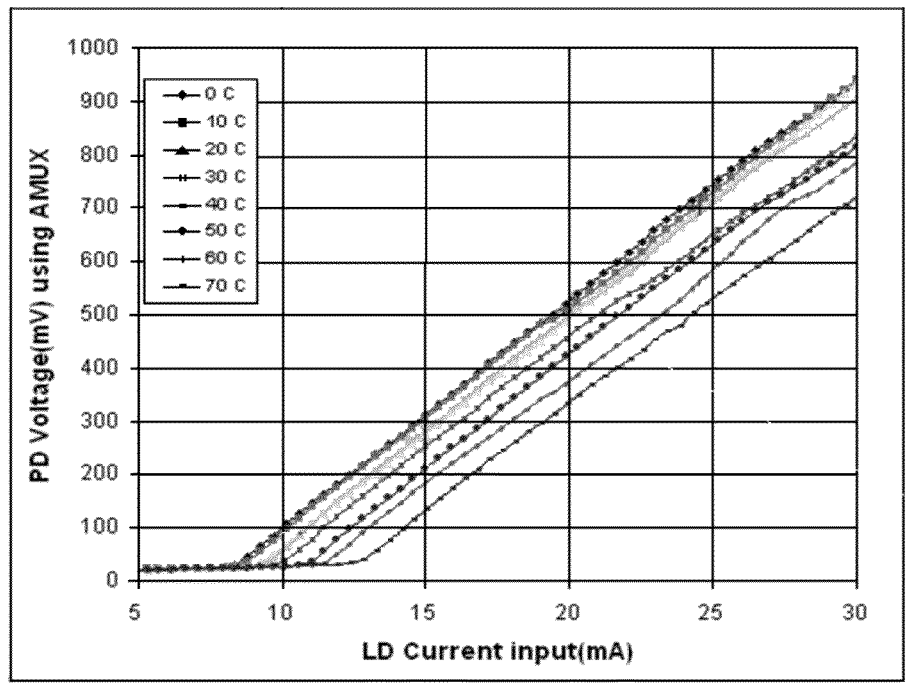
FIG. 4 illustrates a graphical representation illustrating the relationship of applied laser current to sensed laser output power at different temperatures.

FIG. 4 illustrates a graphical representation 240 illustrating the relationship of applied laser current or laser diode (LD) current (on the x-axis) to sensed laser output power (on the y-axis) at different temperatures as measured during the engineering phase. The sensed laser output power is measured by photodetector 127 or bolometer 131 and is typically measured in terms of sensor voltage or current. Photodetector 127 converts photons to electrons, which in turn lead to a voltage that can be measured by preamp 107. Bolometer 131 measures the power of incident electromagnetic radiation via the heating of the material of optical wave guide 119 with a temperature-dependent electrical resistance. As illustrated by graphical representation 240, the relationship can be, but not limited to, linear, and therefore can be described by equation (s) or tables that model such a relationship. For example, if the relationship is linear, the following equations can be used:

$$PD\ Voltage = m[temp] \times LaserCurrent + b[temp] \quad \text{(Eqn. 1)}$$

$$Laser\ Current = \left(\frac{PDVoltage - b[temp]}{m[temp]}\right) \quad \text{(Eqn. 2)}$$

where m[temp] represents the slope of the laser diode current versus photodiode response at a particular temperature and b[temp] represents the y-intercept (or offset value) of the laser diode current versus photodiode response at a particular temperature. As the temperature of the laser diode changes, the values of m[temp] and b[temp] also change. As such, a relationship or table including values of m[temp] and b[temp] at particular photodiode voltages is stored in memory, such as in buffer 106 in FIG. 1. In other embodiments, where the relationship is more complex, curve fitting can be used.

Figure 5:
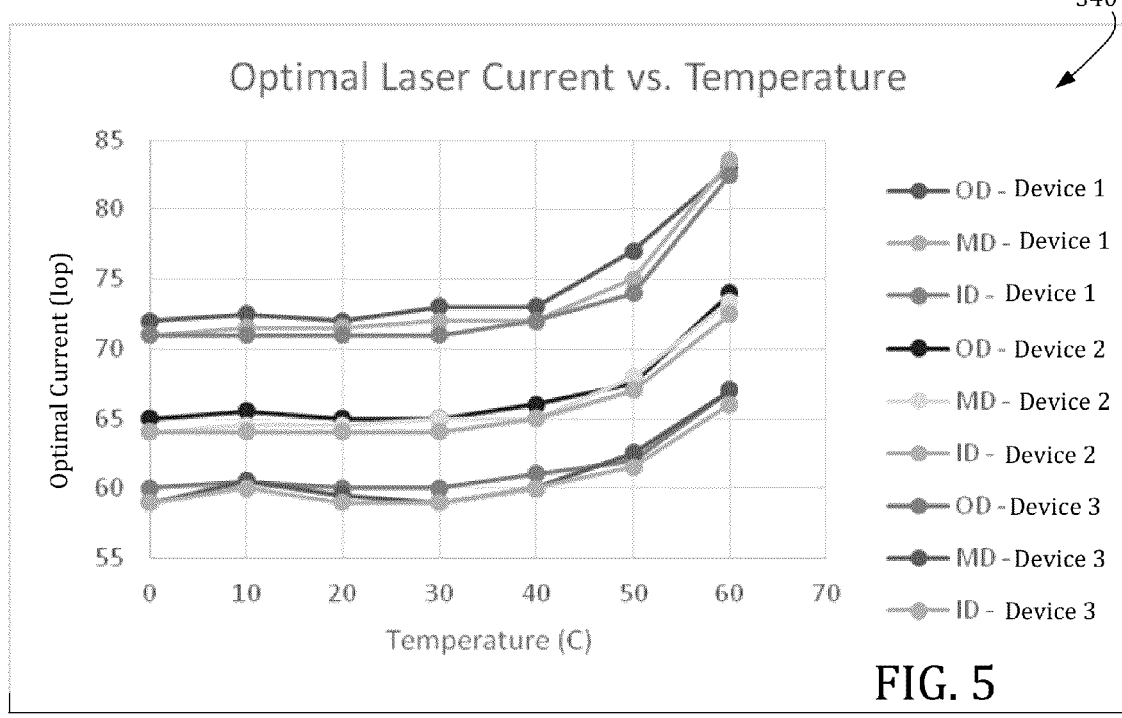
FIG. 5 illustrates a graphical representation illustrating the relationship of optimal applied laser current of a laser versus the temperature of the data storage device.

FIG. 5 illustrates a graphical representation 340 illustrating the relationship of optimal applied laser current ($I_{op}$) of the laser diode versus the temperature of the data storage device for several data storage devices measured during the engineering phase. These relationships may vary by data track radius and/or recording zone. An exemplary method in determining $I_{op}$ includes a triple-track (with squeeze) bit error rate measurement and optimization of laser current for maximum bit error rate at each temperature point. In some embodiments, laser current can be optimized for optimal areal density. In other embodiments, laser current can be optimized for optimal sequential data rate performance. In still other embodiments, laser current can be optimized to maximize the reliability of data storage device 100.

For data storage device 100 illustrated in FIG. 1, a curve is fitted to the data and the following equation can be used to model the relationship:

$$I_{op}(Temp) = (I_{op@20°C}) + 0.03 e^{(0.1 \times Temp)} \quad \text{(Eqn. 3)}$$

In addition to characterizing the $I_{op}$, it is also useful to determine the sensitivity of bit error rate to $I_{op}$ variations.

Specifically, it is important to study how much change in $I_{op}$ from the ideal is nearly inconsequential, and how much change in $I_{op}$ is tolerable before hard errors are induced on the data track of interest or the adjacent data tracks. This information is used to set limits, which will be discussed below. During device manufacturing, it is often only practical (or cost-effective) to measure the optimal applied laser current ($I_{op}$) at a few temperature points (e.g. at one or two temperatures). If $I_{op}$ is measured at a specific temperature, we can use Eqn. 3 or a similar curve fit to compute the $I_{op}$ for all temperatures.

To use sensed laser output power to set the applied laser current to a laser diode in a HAMR device, many devices are first characterized during the engineering phase of product development using the general forms of Eqns. 1-3. Then, during manufacturing, the optimal laser current ($I_{op}$) for each recording zone at one or more temperatures is determined and the relationship between $I_{op}$ and sensed laser power at two or more temperatures and two or more laser currents is determined. Eqns. 1 and 2 are used to extrapolate the relationship to temperature not measured if the relationship is linear. These determinations are used for setting the applied laser current to the laser diode during normal data storage device operation.

Figure 6:
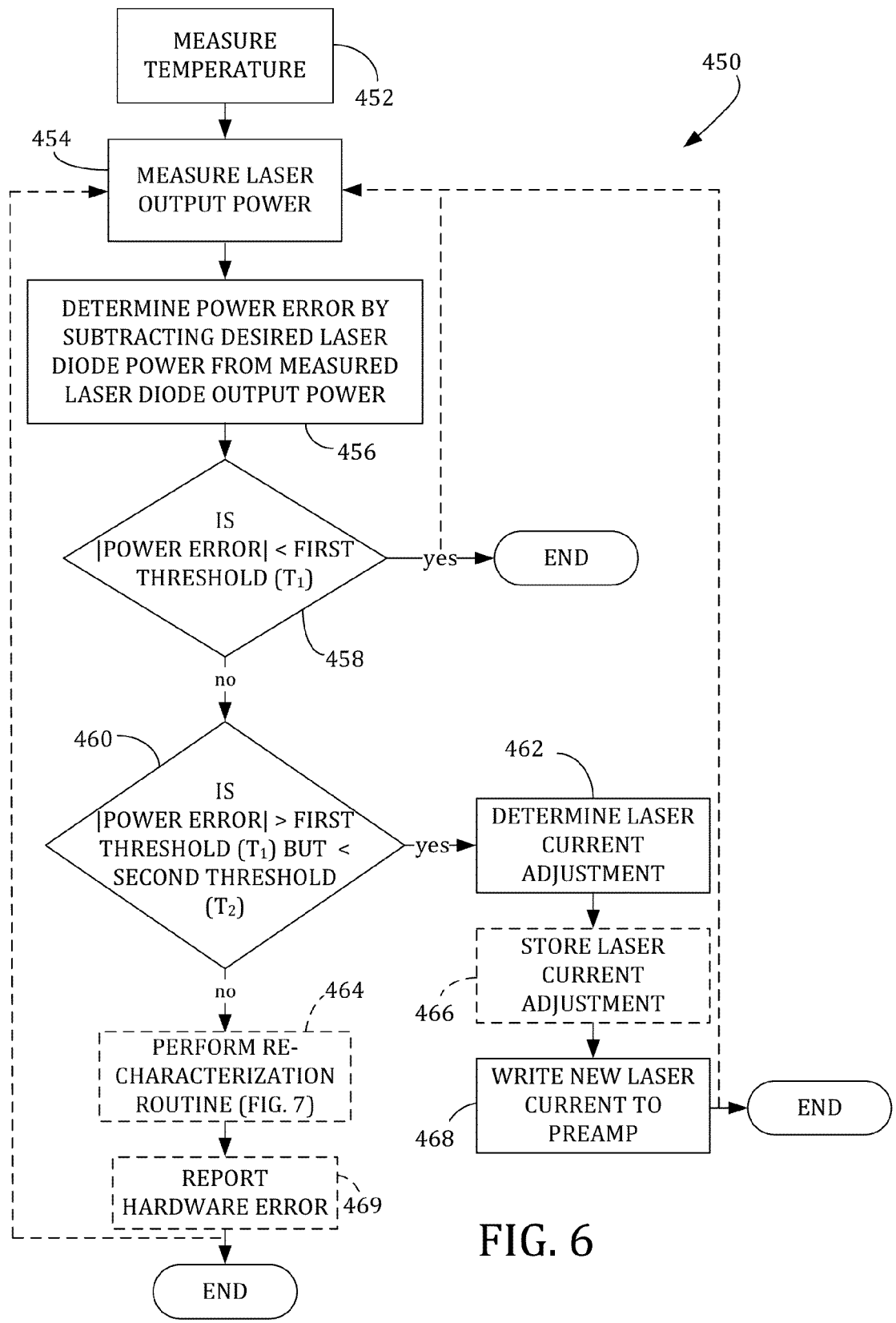
FIG. 6 is a block diagram illustrating a method of calibrating laser diode current in a HAMR device during normal device operation according to one embodiment.

FIG. 6 is a block diagram 450 illustrating a method of calibrating (or setting) laser diode current in a HAMR device during normal device operation. In one embodiment, the calibration occurs when laser assembly 126 is active (i.e., when laser assembly 126 is supplied with sufficient current for writing or erasing data to medium 108). In another embodiment, the calibration occurs when laser assembly 126 is biased (i.e., when laser assembly 126 is supplied with insufficient current for writing or erasing data). Use of calibration in the latter embodiment might be useful over the calibration in the former embodiment if noise from the write process is excessive.

At block 452, the data storage device temperature is measured. For example, data storage device temperature can be sensed by thermistor 128, which is located in proximity to HAMR device 118. At block 454, laser output power or energy of a laser diode located in laser assembly 126 is measured. For example, laser output power can be sensed by photodetector 127 or bolometer 131.

At block 456, power error is determined using the following equation:

$$\text{PowerError} = V_{measured} - V_{op} \quad \text{(Eqn. 4)}$$

where $V_{measured}$ represents the measured voltage of the laser output power and $V_{op}$ represents the optimal, target or desired voltage of laser output power. The power error (PowerError) is the difference between the sensed laser output power and the optimal laser output power. The magnitude of the power error (|PowerError|) is the absolute value of the difference between the sensed laser output power and the optimal laser output power. The optimal laser output power is typically a power where the medium has minimal bit error rate (BER) and adjacent track erasure (ATE).

At block 458, the magnitude of power error is compared to a first threshold value ($T_1$) to determine whether the current being applied to the laser or laser diode needs to be adjusted. The first threshold ($T_1$) is related to how great the power error can be while maintaining the integrity of data on medium 108. If the power error is less than the first threshold value ($T_1$), then the calibration ends. If the power error is greater than the first threshold value ($T_1$), the calibration proceeds to block 460.

At block 460, the magnitude of power error is compare to a second threshold value ($T_2$) to determine whether the current being applied to the laser or laser diode is to be adjusted. The second threshold ($T_2$) is related to how great the power error can be while still maintaining the integrity of data on medium 108. If the power error is less than the second threshold value ($T_2$), then the calibration proceeds to block 462. If the power error is greater than the second threshold value ($T_2$), the calibration proceeds to block 464.

Blocks 464, 466 and 468 pertain to the adjustment of the applied laser input current to the laser. This adjustment is made as a function of the power error and the measured temperature when the power error is greater than the second threshold ($T_2$). At block 462, the following equation is used to determine the laser current adjustment:

$$\text{LaserCurrentAdjustment} = \frac{-\text{PowerError}}{m[\text{temp}]} \quad \text{(Eqn. 5)}$$

where PowerError was determined above in regards to block 456 using Eqn. 4 and m[temp] is the slope at the measured temperature. In other words, m[temp] is accessed from the relationship of values stored in memory, such as in buffer 106, as previously discussed. In particular, the relationship includes values of slope and y-intercept that characterize the relationship amongst temperature, applied laser input current and laser output power.

Block 466 is an optional step in the calibration illustrated in FIG. 6. At block 466, the LaserCurrentAdjustment determined by Eqn. 5 can be stored in memory, such as non-volatile memory, so that it can be used as a starting point for future calibrations if device power is lost. At block 468, the LaserCurrentAdjustment determined in block 456 is applied or added to the programmed current on future operations. More specifically, the new laser current needed can be written to a register in preamp 107.

In one embodiment, the adjustments can be made globally (i.e., one adjustment value per head or transducer) or more locally (i.e., per head and/or per zone). If correction is performed globally, the amplitude of correction per zone can be pro-rated depending on ideal laser current in the zone. If correction adjustments are fine-tuned per zone, a large disruption in one zone can trigger similar adjustments in other zones, or can trigger re-calibration activities before writing user data.

After the laser current adjustment has been made, the calibration ends or, in the alternative, steps 454, 456, 458 and 460 can be repeated until the difference between the sensed laser output power and the optimal laser output power is below the first threshold ($T_1$). In one embodiment and where the power error is greater than the second threshold value ($T_2$), the calibration can optionally pass to block 464 and perform a re-characterization routine as will be discussed below and illustrated in block diagram 570 of FIG. 7 or the calibration can pass to block 469 and report a hardware error. After either the re-characterization routine is completed or the hardware error is reported, the calibration can end or, in the alternative, steps 454, 456, 458 and 460 can be repeated until the difference between the sensed laser output power and the optimal laser output power is below the first threshold value ($T_1$).

Figure 7:
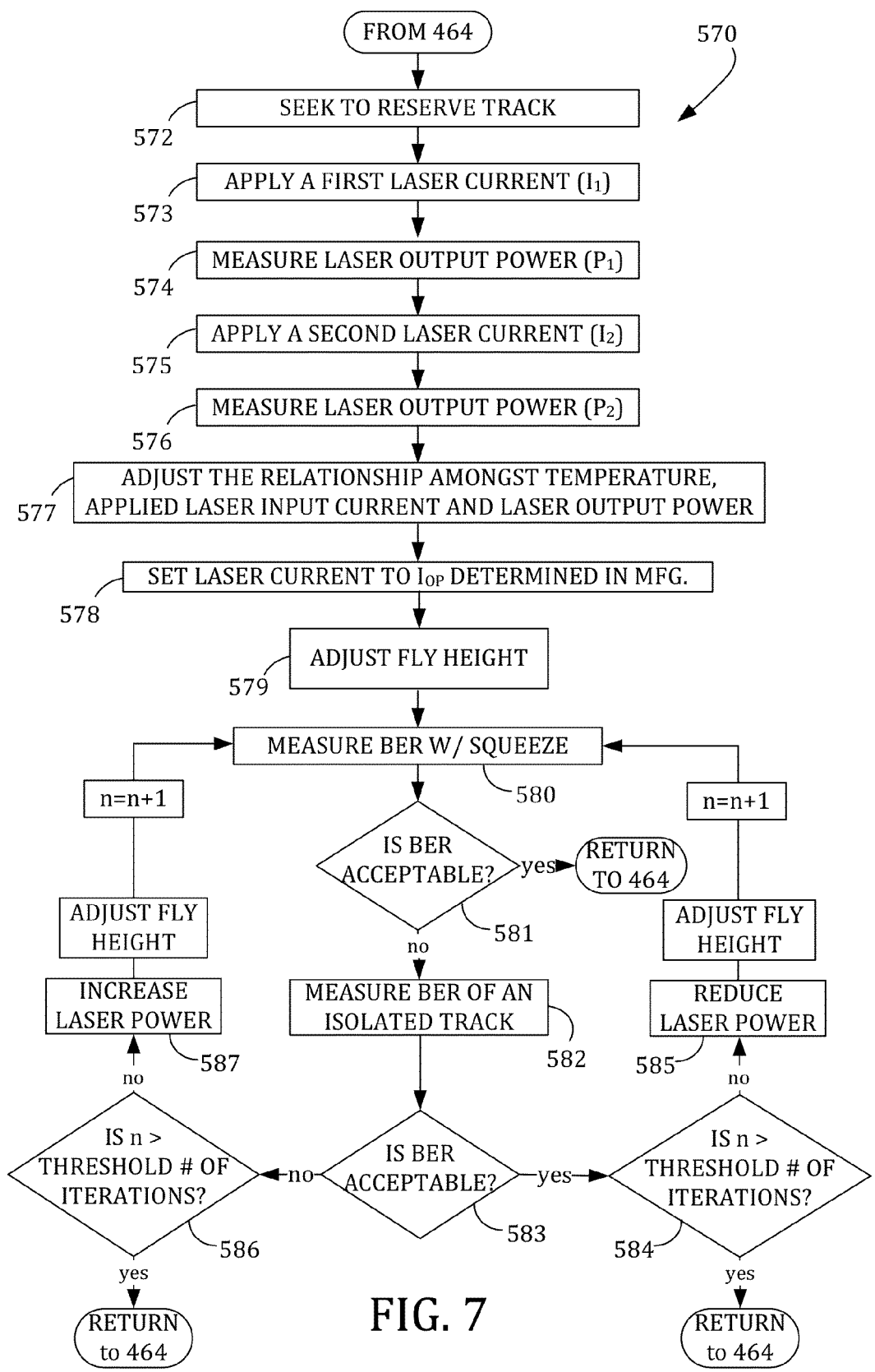
FIG. 7 illustrates a re-characterization method that can be performed when a magnitude of power error determined in FIG. 6 is too large or can be initiated for other reasons.

Block diagram 570 in FIG. 7 illustrates a characterization or re-characterization routine or method that can be performed when the magnitude of power error is too large or under other circumstances or for other reasons, such as host initiated re-characterization, time-based re-characterization or based on a fixed type of drive activity. The method performed in FIG. 7 characterizes or re-characterizes the relationship amongst temperature, applied laser current and laser output power. If the calibration illustrated in FIG. 6 sends the process to this re-characterization routine, this is an alert that something might have drastically changed in the recording head or elsewhere in the system. If this occurs, it is important to have the device perform additional internal assessments to determine whether it is still operating properly and functional enough to continue.

At block 572, control circuitry 102 (FIG. 1) performs a seek to move slider 118 to seek to a reserve track on medium 108. For example, the reserved track is the middle track in a band of five tracks and is reserved for testing such that if we erase this track no user data is damaged. At block 573, a first laser current ($I_1$) is applied. At block 574, a first laser output power ($P_1$) is measured based on the applied first laser current ($I_1$). At block 575, a second laser current ($I_2$) that is different from the first laser current ($I_1$) is applied. At block 576, a second laser output power ($P_2$) is measured based on the applied second laser current ($I_2$).

At block 577, the relationship determined above is adjusted using the first laser current ($I_1$) applied in block 573, the first laser output power ($P_1$) measured in block 574, the second laser current ($I_2$) applied in block 575 and the second laser output power ($P_2$) measured in block 576. For example, if the relationship is linear, Eqns. 1-2 can be used to compute the slope (m) and y-intercept or offset values (b). The new computed slope and offset values replace the old values stored in the table and therefore adjust the relationship.

At block 578, the laser current is set to the optimal laser current ($I_{op}$) as was determined during manufacturing. With a change in laser current, at block 579, the fly height of recording head 118 is also adjusted. After $I_{op}$ is set, a metric of recording performance is measured to determine if the new relationship is acceptable. The recording performance metric can be, but is not limited to, track average amplitude (TAA), track width, ability to erase known information and bit error rate. In FIG. 7 and in one embodiment, block diagram 570 uses bit error rate (BER) as the recording performance metric.

In this embodiment, at block 580 bit error rate (BER) with squeeze is measured. BER with squeeze means that a data track is first written and then adjacent tracks are written on either side of the data track at a fixed track pitch. The track pitch of the adjacent tracks relative to the data track is directly proportional to the allowable amount of encroachment of the adjacent tracks on the data track. At block 581, it is determined whether the BER of a track written with squeeze is acceptable. If so, then the method returns to block 464 in block diagram 450. If not, then the method passes to block 582 to measure an isolated track BER, which means only a single data track is written with no adjacent tracks.

At block 583, it is determined whether the BER of the isolated data track written is acceptable. If so, then the method passes to block 584 and a determination is made as to whether the number (n) of BER measurements or the number of iterations (n) of BER measurements made in the re-characterization routine are greater than or less than an acceptable or threshold amount of iterations. If the iteration number (n) is less than a threshold number of iterations, the method passes to block 585 and laser power output is reduced. If the iteration number (n) is greater than the threshold number of iterations, the method returns to block 464 in block diagram 450.

If the BER of the isolated data track is unacceptable, then the method passes to block 586 and a determination is made as to whether the number (n) of BER measurements or the number of iterations (n) of BER measurements made in the re-characterization routine are greater than or less than an acceptable or threshold amount of iterations. If the iteration number (n) is less than a threshold number of iterations, the method passes to block 587 and laser power output is increased. If the iteration number (n) is greater than the threshold number of iterations, the method returns to block 464 in block diagram 450.

After either laser power is reduced in block 585 or increased in block 587, the fly height of recording head 118 is adjusted, the number of iterations is increased by one and the method returns to block 580 to again measure BER with squeeze. The method repeats steps 580, 581, 582 and 583 until the BER is a satisfactory value. If an acceptable BER is never achieved within a set number of iterations, the recording head is bad and data storage device 100 should report this status to the host 114.

The calibration method and routine described in FIG. 6 can be called during various data storage device operations. In one embodiment, the calibration can be called when laser assembly 126 is in an active state where the laser power is sufficient to write and erase data, such as during normal write operation. In another embodiment, the calibration can be called when laser assembly 126 is in a biased state where the laser power is insufficient to write and erase data, such as during a write seek.

In the exemplary write seek embodiment, the calibration can be called on a write seek for each servo wedge ahead of a write operation. In this way, before data is written, any temperature and other effects of the laser are compensated. This will take into account and correct not only for drive temperature changes but also changes in laser due to self-heating. In addition, if the output of preamp 107 also changes with temperature, using the calibration routine on each wedge will also correct for these effects. In order for the calibration routine to work on each servo wedge, it must be completed during the servo gate period. If this is not possible, the calibration routine can update one wedge late. For example, on wedge 1 values are measured, but they are not updated until wedge 2.

In the exemplary write seek embodiment, the calibration can alternatively be called by the firmware during write seek. When the write seek command is issued, the head is moved to the desired track. Since the laser output power during seeking is lower than what is required to write on medium 108, servo information will not be damaged. In this embodiment, the temperature effects are corrected on every write command from control circuitry 102. For long sequential writes, the calibration routine could be performed during track switch seeks or during head switches. For very long sequential writes, writing could be interrupted to issue the calibration routine.

Other opportunities for the calibration routine to be called when laser assembly 126 is in either active or biased states include on a head switch in a multi-headed device, on a temperature change as measured by an onboard temperature sensor in the date storage device, on a temperature change of preamp 107 or channel 110, on a write and verify command as part of a detected error metric exceeding a threshold, on a fixed interval (i.e., time, quantity of sectors written, etc.) as specified by firmware, when the data storage device exits from an idle condition, on a reading from an internal bolometer in the head, such as a fly-height thermistor sensor or other thermal resistor, on the detection of variance of the laser diode forward voltage drop in laser assembly 126 and during drive manufacturing, either at one or two temperatures. If only performed at one temperature during manufacture, the compensation for temperature uses fixed default constants.

Figure 8:
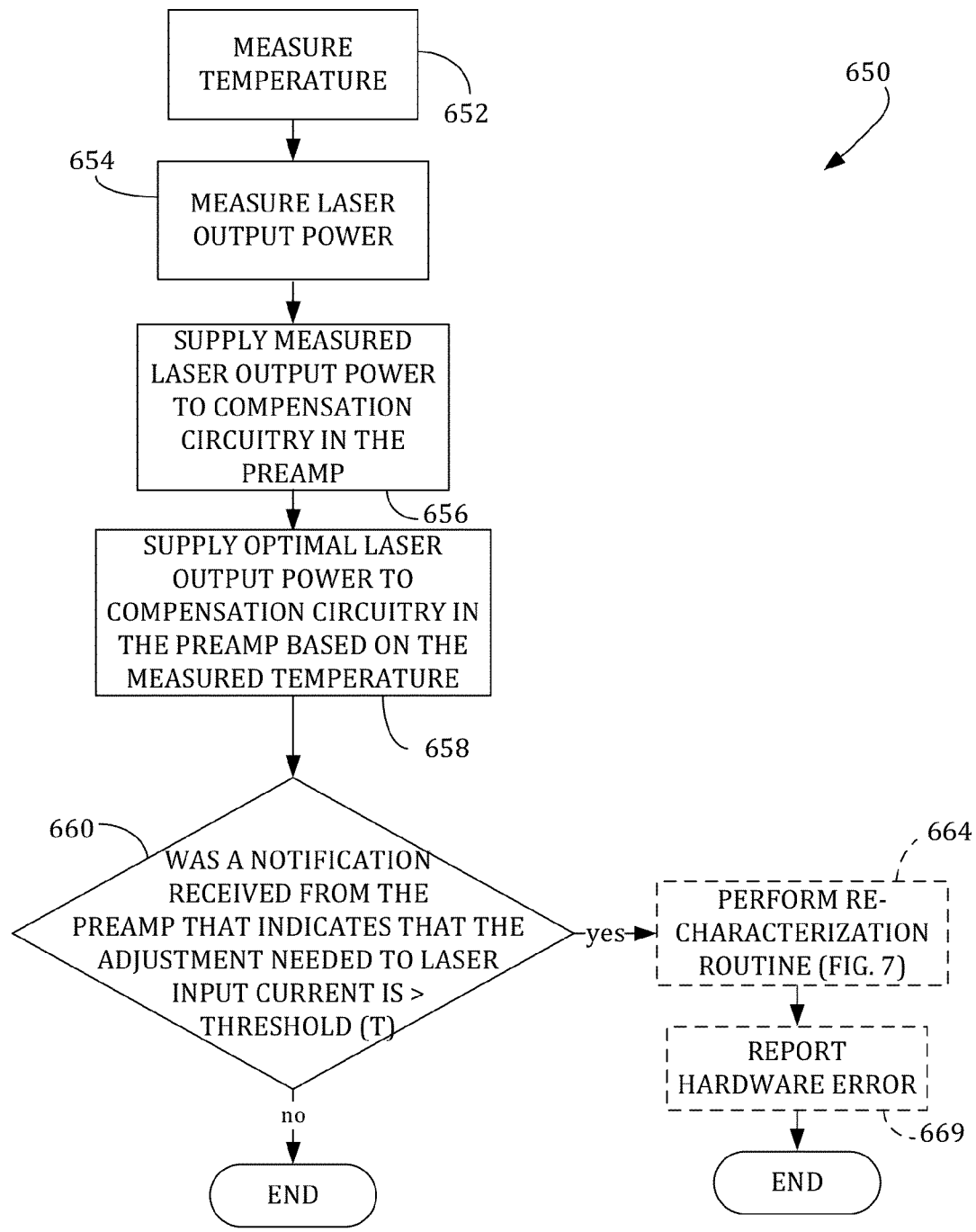
FIG. 8 is a block diagram illustrating a method of calibrating laser diode current in a HAMR device during normal device operation according to another embodiment.

FIG. 8 is a block diagram 650 illustrating a method of calibrating (or setting) laser diode current in a HAMR device during normal device operation. In one embodiment, the calibration occurs when laser assembly 126 is active. In another embodiment, the calibration occurs when laser assembly 126 is biased. In FIG. 8, rather than using control circuitry in data storage device 100, hardware in preamp 107, such as compensation circuitry 109, is used to make adjustments to laser input current to achieve optimal laser output power. For example, Texas Instruments® TI5563 preamp contains such hardware compensation circuitry. Data storage device 100 need only control preamp registers to invoke preamp internal hardware for compensation.

At block 652, data storage device 100 measures the data storage device temperature. For example, data storage device temperature can be sensed by thermistor 128, which is located in proximity to HAMR device 118. At block 654, data storage device 100 measures laser output power or energy of a laser diode located in laser assembly 126. For example, laser output power can be sensed by a photodetector located in laser assembly 126 or bolometer 131 located in optical wave guide 119. At block 656, data storage device 100 supplies the measured laser output power to compensation circuitry 109 in preamp 107. At block 658, control circuitry 102 supplies an optimal laser output power based on the measured temperature to compensation circuitry 109. The optimal laser output power is accessed from the relationship stored in memory, such as buffer 106, and as previously discussed. In particular, if the relationship is linear buffer 106 can include values of slope and y-intercept that characterize the linear relationship amongst temperature, applied laser input current and laser output power.

At block 660, control circuitry 102 determines if a notification was received from preamp 107 that the adjustment needed to the laser input current is greater than a threshold (T) amount. If so, the method passes to block 664 and performs a re-characterization routine, which was discussed and illustrated in block diagram 570 of FIG. 7, or the calibration can pass to block 669 and report a hardware error. After either the re-characterization routine is completed or the hardware error is reported, the calibration ends. If no notification is received from preamp 107, the calibration ends.

Additions to the calibrations illustrated in FIGS. 6 and 8 include performing fly height adjustments to slider 122 based on the adjustments to laser output power caused by temperature.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
    applying at least one laser input current to a laser in a heat assisted magnetic recording device;
    measuring laser output power of the laser at the at least one applied laser current;
    characterizing a relationship amongst temperature, the applied laser input current and the laser output power;
    setting the laser input current to an optimal laser current as determined at manufacturing; and
    measuring a metric of recording performance to determine if the relationship is acceptable.

2. The method of claim 1, wherein applying the at least one laser current to the laser and measuring the laser output power of the laser comprises applying the at least one laser current to the laser when the heat assisted magnetic recording device is positioned over a reserved test track.

3. The method of claim 1, wherein applying the at least one laser current to the laser and measuring the laser output power of the laser comprises:
    applying a first laser input current to the laser;
    measuring a first laser output power of the laser at the first laser input current;
    applying a second laser input current that is different from the first laser input current to the laser; and
    measuring a second laser output power of the laser at the second laser input current.

4. The method of claim 1, wherein characterizing the relationship amongst temperature, the applied laser input current and the laser output power comprises characterizing a linear relationship amongst the temperature, the applied laser input current and the laser output power by computing a slope and a y-intercept based on the at least one laser current applied to the laser and the measured laser output power.

5. The method of claim 1, further comprising adjusting a fly height of a slider of the heat assisted magnetic recording device after setting the laser current to the optimal laser current as determined at manufacturing.

6. The method of claim 1, wherein measuring the metric of recording performance to determine if the relationship is acceptable comprises measuring one of track average amplitude, track width, an ability to erase known information and bit-error rate.

7. The method of claim 1, wherein measuring the metric of recording performance to determine if the relationship is acceptable comprises:
    measuring bit-error rate with squeeze; and
    determining if the bit-error rate with squeeze is acceptable.

8. The method of claim 7, further comprising:
    measuring bit-error rate on an isolated data track if the measured bit-error rate with squeeze is unacceptable; and
    determining if the bit-error rate on the isolated data track is acceptable.

9. The method of claim 8, further comprising:
    reducing the laser output power of the laser if the measured bit-error rate on the isolated data track is acceptable; and
    repeating the step of measuring bit-error rate with squeeze if the number of times the bit-error rate has been measured has not exceeded a threshold value and until the bit-error with squeeze is acceptable.

10. The method of claim 9, further comprising adjusting fly height of a slider of the heat assisted magnetic recording device after reducing the laser output power of the laser.

11. The method of claim 8, further comprising:
    increasing the laser output power of the laser if the measured bit-error rate on the isolated data track is unacceptable; and
    repeating the step of measuring bit-error rate with squeeze if the number of times the bit-error rate has been measured has not exceeded a threshold value and until the bit-error rate with squeeze is acceptable.

12. The method of claim 11, further comprising adjusting fly height of a slider of the heat assisted magnetic recording device after increasing the laser output power of the laser.

13. A data storage device comprising:
    a medium;
    a heat assisted magnetic recording device including a laser for heating the medium while writing data; and
    control circuitry configured to:

apply at least one laser current to a laser in the heat assisted magnetic recording device;

measure laser output power of the laser at the at least one applied laser current;

characterize a relationship amongst temperature, the applied laser input current and the laser output power; and measure a metric of recording performance to determine if the relationship is acceptable.

14. The data storage device of claim 13, wherein when the control circuitry applies the at least one laser current to the laser and measures the laser output power of the laser, the control circuitry is configured to:

apply a first laser input current to the laser;

measure a first laser output power of the laser at the first laser input current;

apply a second laser input current that is different from the first laser input current to the laser; and measure a second laser output power of the laser at the second laser input current.

15. The data storage device of claim 13, wherein when the control circuitry characterizes the relationship amongst the temperature, the applied laser input current and the laser output power, the control circuitry is configured to characterize a linear relationship amongst the temperature, the applied laser input current and the laser output power by computing a slope and a y-intercept based on the at least one laser current applied to the laser and the measured laser output power.

16. The data storage device of claim 13, wherein the control circuitry is further configured to adjust a fly height of a slider of the heat assisted magnetic recording device after setting the laser current to an optimal laser current as determined at manufacturing.

17. A method comprising:

measuring a first laser output power of a laser used to record data on a head assisted magnetic recording medium, the first laser output power is measured at a first laser input current;

measuring a second laser output power of the laser, the second laser output power is measured at a second laser input that is greater than or less than the first laser input current;

characterizing a relationship amongst temperature, the laser input current and the laser output power; and verifying the relationship by measuring a metric of recording performance.

18. The method of claim 17, wherein the first laser input current and the second laser input current comprise currents that are insufficient to record or erase data on the recording medium.

19. The method of claim 17, wherein the first laser input current and the second laser input current comprise currents that are sufficient to record or erase data on the recording medium.

20. The method of claim 19, wherein characterizing the relationship amongst the temperature, the applied laser input current and the laser output power comprises characterizing a linear relationship amongst the temperature, the applied laser input current and the laser output power by computing a slope and a y-intercept based on the first laser current applied to the laser, the first measured laser output power, the second laser current applied to the laser and the second measured laser output power.

* * * * *